(12) United States Patent
Dawkins

(10) Patent No.: US 8,175,208 B2
(45) Date of Patent: May 8, 2012

(54) METHOD OF REDUCING D.C. OFFSET

(75) Inventor: Mark Dawkins, Oxfordshire (GB)

(73) Assignee: Future Waves UK Limited, London (GB)

(*) Notice: Subject to any disclaimer, the term of this patent is extended or adjusted under 35 U.S.C. 154(b) by 884 days.

(21) Appl. No.: 12/161,155

(22) PCT Filed: Jan. 19, 2007

(86) PCT No.: PCT/GB2007/050028
§ 371 (c)(1),
(2), (4) Date: Jul. 16, 2008

(87) PCT Pub. No.: WO2007/085870
PCT Pub. Date: Aug. 2, 2007

(65) Prior Publication Data
US 2010/0166114 A1    Jul. 1, 2010

Related U.S. Application Data

(60) Provisional application No. 60/761,363, filed on Jan. 24, 2006.

(30) Foreign Application Priority Data

Mar. 3, 2006  (GB) .................................. 0604275.8

(51) Int. Cl.
*H03D 3/24* (2006.01)
(52) U.S. Cl. ........................................ 375/374; 375/375
(58) Field of Classification Search .................. 375/257, 375/285, 346, 374, 375, 376
See application file for complete search history.

(56) References Cited

U.S. PATENT DOCUMENTS

| 5,471,665 | A | | 11/1995 | Pace |
| 5,898,912 | A | * | 4/1999 | Heck et al. .................. 455/234.2 |
| 6,128,266 | A | * | 10/2000 | Maruyama ............... 369/124.01 |
| 6,211,716 | B1 | | 4/2001 | Nguyen |
| 6,285,225 | B1 | | 9/2001 | Chu et al. |
| 6,552,615 | B1 | * | 4/2003 | Pavan et al. ................... 330/308 |
| 6,661,858 | B1 | | 12/2003 | Beaudin |
| 6,781,424 | B2 | * | 8/2004 | Lee et al. ...................... 327/113 |
| 6,968,172 | B2 | | 11/2005 | Saito |

(Continued)

FOREIGN PATENT DOCUMENTS

JP    8286165    11/1996

(Continued)

OTHER PUBLICATIONS

International Search Report for International Application No. PCT/GB2007/050028.

(Continued)

*Primary Examiner* — Don N Vo
(74) *Attorney, Agent, or Firm* — Caesar, Rivise, Bernstein, Cohen & Pokotilow, Ltd.

(57) ABSTRACT

A method of reducing d.c. offset comprises comparing the a first variable signal with a second variable signal, producing a control signal in dependence upon the comparison, providing the control signal to a charge pump for generation of a feedback signal, and varying the first signal and/or the second signal in dependence upon the feedback signal thereby reducing any difference between the d.c. level of the first signal and the d.c. level of the second signal.

22 Claims, 1 Drawing Sheet

U.S. PATENT DOCUMENTS

| | | |
|---|---|---|
| 7,272,164 B2 * | 9/2007 | Sorrells et al. ............... 375/147 |
| 2003/0151443 A1 | 8/2003 | Kondo |
| 2003/0206054 A1 * | 11/2003 | Jin et al. ...................... 330/69 |
| 2004/0121746 A1 | 6/2004 | Akamine et al. |
| 2005/0195024 A1 | 9/2005 | Cheng |
| 2005/0271173 A1 | 12/2005 | Chou |
| 2007/0177703 A1 | 8/2007 | Senba |

FOREIGN PATENT DOCUMENTS

| | | |
|---|---|---|
| JP | 2005072893 | 3/2005 |

OTHER PUBLICATIONS

Search Report for Application No. GB 0604275.8.

* cited by examiner

METHOD OF REDUCING D.C. OFFSET

CROSS-REFERENCE TO RELATED APPLICATIONS

This national stage application claims the benefit under 35 U.S.C. §371 of International Application No. PCT/GB2007/050028 filed on Jan. 19, 2007, entitled A METHOD OF REDUCING D.C. OFFSET, which takes its priority from U.S. Provisional Application No. 60/761,363 filed on Jan. 24, 2006 and also takes its priority from GB Application No. 0604275.8 filed on Mar. 3, 2006, and all of whose entire disclosures are incorporated by reference herein.

BACKGROUND OF THE INVENTION

1. Field of Invention

The present invention relates to a method of, and apparatus for, reducing d.c. offset in a signal, in particular in a signal in a radio receiver such as an FM or Digital Audio Broadcasting (DAB) radio receiver.

The invention is of particular relevance to the reduction of d.c. offset in a signal resulting from the downconversion of a received radio signal from a carrier frequency to an intermediate frequency, and more especially to a signal resulting from the direct downconversion of a received radio signal from a carrier frequency to baseband frequency.

2. Description of Related Art

It is well known in the art to downconvert received FM radio signals at a carrier frequency to a lower, intermediate frequency (IF) before detection and other processing takes place. This has the advantage that the detection and other processing stages need only be designed to operate at a relatively narrow range of frequencies around the intermediate frequency.

Similarly, it is known to downconvert DAB radio signals at a carrier frequency to a lower, intermediate frequency (IF) before detection and other processing takes place. In the final stages of processing, the IF signals are downconverted again to the baseband frequency.

Alternatively, it is known to downconvert DAB radio signals directly from the carrier frequency to the baseband frequency without first downconverting to an intermediate frequency. In that case, the radio signals at the carrier frequency are mixed with a signal from a local oscillator (LO) at the receiver operating at the carrier frequency. However, a significant problem with direct downconversion of DAB radio signals is that large d.c. offsets are often introduced into the downconverted signal, for instance because of interference from the local oscillator feeding back into the signal received at the antenna of the receiver, or feeding back into other parts of the receiver circuitry.

It is known that attempts have been made to reduce the d.c. offsets in downconverted signals by including feedback circuits which operate by comparing a downconverted signal to a constant reference signal representing the expected d.c. level of the downconverted signal and then altering the d.c. level of the downconverted signal in dependence upon the comparison. However, the use of such feedback circuits can be problematic as the expected d.c. level may depend upon the characteristics of components of the receiver circuitry, such as amplifiers, which may vary from component to component and which may change over time. Accordingly the expected d.c. level may differ from or drift away from the constant reference signal, causing additional d.c. offset problems.

BRIEF SUMMARY OF THE INVENTION

It is an aim of the present invention to provide an improved, or at least alternative, method of, and apparatus for, reducing d.c. offset in a signal. Accordingly, in a first aspect there is provided a method of reducing d.c. offset, the method comprising comparing a variable first signal to a variable second signal, producing a control signal in dependence upon the comparison, providing the control signal to a charge pump for generation of a feedback signal, and varying the first signal and/or the second signal in dependence upon the feedback signal thereby to reduce any difference between the d.c. level of the first signal and the d.c. level of the second signal.

By comparing the first signal and the second signal one with another, rather than with a reference signal, errors due to drift of the expected d.c. level of the first or second signal with respect to the reference signal may be avoided. This is particularly advantageous when the first signal and the second signal may be expected to have the same or a similar d.c. level, for instance if they have passed through the same input circuitry or if they are components of the same signal. The method may in particular correct d.c. error due to device mismatches, local oscillator feedthrough self-mixing and second order distortion.

The comparison may comprise comparing the d.c. level of the first signal with the d.c. level of the second signal.

Alternatively or additionally, the comparison may comprise comparing the instantaneous voltage level of the first signal with the instantaneous voltage level of the second signal. The comparison may comprise comparing the instantaneous magnitude of the first signal with the instantaneous magnitude of the second signal.

Preferably the step of varying the first signal and/or the second signal comprises varying the d.c. level of the first signal and/or the d.c. level of the second signal.

The first signal and the second signal are usually time varying signals. In that case, the variation of the first signal and/or the second signal in dependence on the feedback signal will usually be applied to a later point in the first signal and/or the second signal than the point at which the comparison of the first signal with the second signal took place to produce that feedback signal. However, the time lag between the comparison of the first signal with the second signal and the application of the resulting feedback signal to the first signal and/or second signal will usually be small compared to the time scale over which the d.c. level of the first signal and/or second signal may vary.

In the case of time varying first and second signals, the method is usually carried out as a feedback loop, usually on a continuous basis with the comparison of the first signal to the second signal occurring continuously and a feedback signal being produced continuously, typically with a small time lag between the comparison and the variation of d.c. level in dependence upon the resulting feedback signal. So, at each instant, the instantaneous voltage of the first signal may be compared to the instantaneous voltage of the second signal pertaining at that instant.

Preferably, the comparison is of the magnitude of the first signal with the magnitude of the second signal.

The method may comprise the further step of providing the control signal to a current sink of the charge pump.

The method may comprise the further step of providing an output of the charge pump to a capacitor for generation of the feedback signal.

The feedback signal may be proportional to the potential difference across the capacitor.

Preferably the first signal and the second signal are each obtained from the same input signal. So, for instance, the first signal and the second signal may each be, or comprise, a respective component of the same input signal and/or or the first signal and the signal may each be, or comprise, a signal resulting from a respective processing step applied to the same input signal.

Preferably the first signal and the second signal are each obtained by downconversion of a received radio-frequency signal, preferably a received radio-frequency DAB signal. Preferably the first signal and the second signal are each obtained from the in-phase component or the quadrature component of the radio-frequency signal.

The first signal may be the result of applying a first filter to the input signal and the second signal may be the result of applying a second filter to the input signal, and preferably the first filter is around 180° out of phase with the second filter. Preferably the first filter is 180° out of phase with the second filter.

The first signal may be out of phase with the second signal, and preferably the first signal is around 180° out of phase with the second signal. Even more preferably the first signal is 180° out of phase with the second signal.

In the case where the first signal is out of phase with the second signal, the comparison of the first signal to the second signal may be a comparison of the magnitude of the first signal to the magnitude of the second signal (in that case, by way of example if the first signal was, say, 180° out of phase with the second signal then, at a particular instant, the first signal might have an instantaneous value of, say, 2V and the second signal may have an instantaneous value of say −2V, and the signals would be considered to have the same magnitude at that instant).

The first signal may comprise the signal on the positive path of an in-phase channel or quadrature channel of a DAB receiver and the second signal may comprise the signal on the negative path of the channel.

The method may further comprise producing the feedback signal in dependence upon at least one earlier value of the feedback signal as well as in dependence upon the comparison.

Thus the value of the feedback signal may depend on earlier values of the feedback signal as well as on the results of the comparison of the first signal with the second signal. This is particularly advantageous in the case where the d.c. level of the first signal relative to the d.c. level of the second signal may vary rapidly and sharply.

Preferably the method comprises increasing the feedback signal if the first signal is higher than the second signal, and decreasing the feedback signal if the second signal is higher than the first signal.

The method may further comprise increasing the feedback signal only if the first signal is higher than the second signal by more than a pre-determined amount, and decreasing the feedback signal only if the second signal is higher than the first signal by more than a pre-determined amount.

Thus, if the first signal is higher than the second signal by less than a pre-determined amount or the first signal is lower than the second signal by less than a pre-determined amount the feedback signal preferably will not change. Thus, it may be arranged that small differences in the level of the first signal and the level of the second signal do not feedback to produce changes in d.c. level.

In a further aspect of the invention there is provided apparatus for reducing d.c. offset, comprising amplification means adapted to vary a first signal and/or a second signal, means adapted to compare the first signal with the second signal and to produce a control signal in dependence upon the comparison, and means for producing a feedback signal and for passing the feedback signal back to the amplification means, the means for producing the feedback signal being adapted to receive the control signal and including a charge pump, the amplification means being further adapted to receive the feedback signal and to vary the first signal and/or the second signal in dependence on the feedback signal so as to reduce any difference between the d.c. level of the first signal and the d.c. level of the second signal.

The amplification means may have a negative gain, a positive gain, or unity gain.

The amplification means may be adapted to vary the d.c. level of the first signal and/or the d.c. level of the second signal. The comparison means may be adapted to compare the d.c. level of the first signal with the d.c. level of the second signal. Alternatively or additionally, the comparison means may be adapted to compare the instantaneous voltage level of the first signal with the instantaneous voltage level of the second signal.

Preferably the means for producing a feedback signal is adapted to produce the feedback signal in dependence upon at least one earlier value of the feedback signal as well as in dependence upon the comparison.

The means for producing a feedback signal may be adapted to increase the feedback signal if the first signal is higher than the second signal, and to decrease the feedback signal if the second signal is higher than the first signal.

Preferably the charge pump comprises a current sink, the current sink having an input for receiving the control signal.

Preferably the means for producing a feedback signal comprises a capacitor, the capacitor being adapted to receive an output from the charge pump.

Preferably the means for producing the feedback signal is adapted to vary the feedback signal in dependence upon the potential difference across the capacitor.

The use of a capacitor may provide damping in the feedback loop. The value of the capacitor may be selected to have a suitable time constant in relation to the likely variation with time of the difference between the d.c. level of the first signal and the d.c. level of the second signal.

Preferably the means for producing a feedback signal comprises means for varying the potential difference across the capacitor, the means for varying the potential difference across the capacitor being adapted to increase the potential difference across the capacitor if the first signal is higher than the second signal and to reduce the potential difference across the capacitor if the second signal is higher than the first signal.

The charge pump may comprise a current source connected to the capacitor and the current source may be adapted to output a first current if the first signal is higher than the second signal, and to output a second current if the second signal is higher than the first signal.

Preferably the first signal and the second signal are each obtained from the same input signal. The first signal and the second signal may each be obtained by downconversion of a received radio-frequency signal, preferably a received radio-frequency DAB signal.

Any feature in one aspect of the invention may be applied to another aspect of the invention, in any appropriate combination. In particular, apparatus features may be applied to method features and vice versa.

BRIEF DESCRIPTION OF THE DRAWING

Preferred features of an embodiment of the invention will now be described, purely by way of example, and with reference to the accompanying drawing.

DETAILED DESCRIPTION OF THE INVENTION

Figure 1:
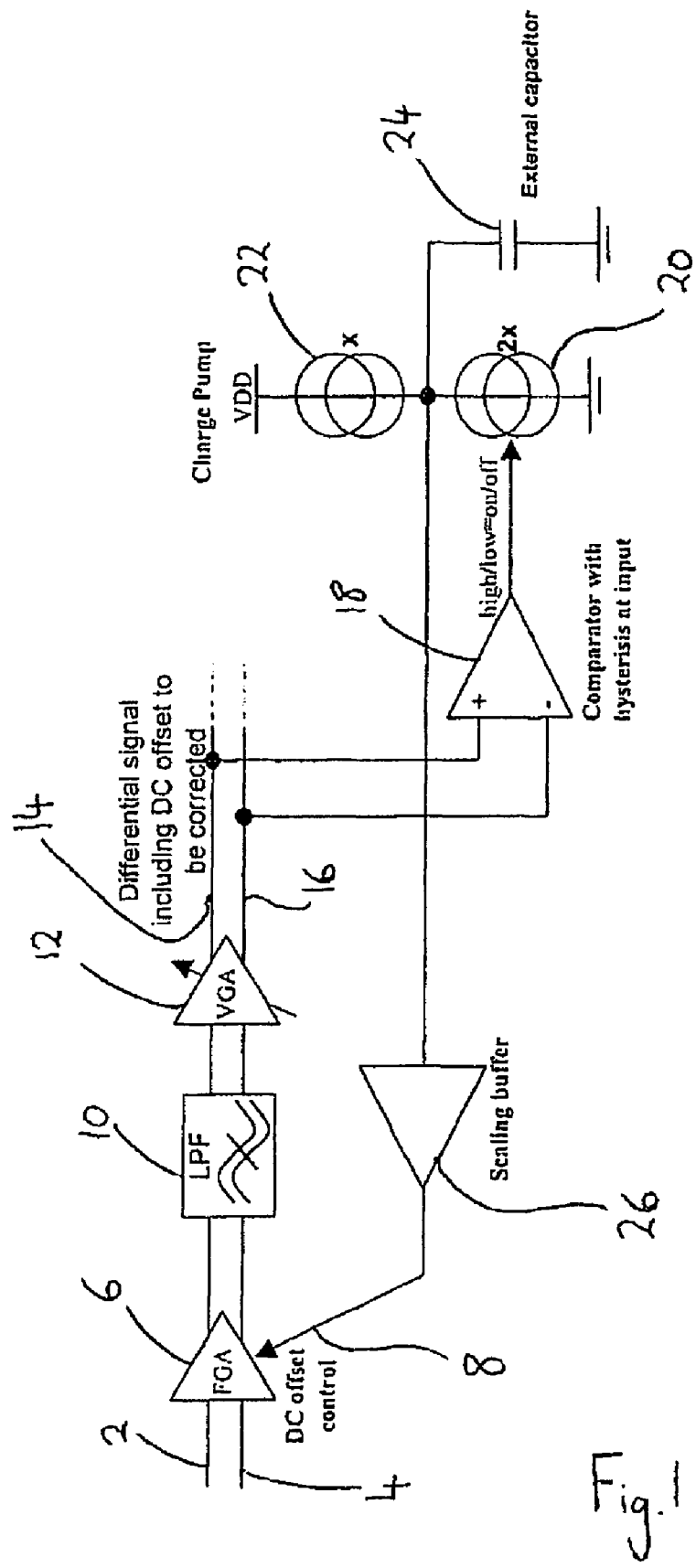
FIG. 1, which is a schematic diagram of a portion of a DAB radio receiver chip.

The portion of the DAB radio receiver chip shown in FIG. 1 comprises inputs 2, 4 connected to a fixed gain amplification (FGA) stage 6. A further input 8 is also connected to the FGA stage.

Fully differential circuitry is employed throughout, thus every stage outputs a differential signal comprising of p and n paths, which are 180 degrees out of phase and, in the ideal case, of equal magnitude. In reality, the magnitude of the signals on the p path and n path may differ.

The fixed gain amplification stage 6 in the preferred embodiment comprises a pair of differential amplifiers (not shown) but other ways of providing a fixed gain amplification stage can of course be envisaged.

The outputs of the FGA stage 6 are connected to a low pass filter (LPF) 10 and then to a variable gain amplifier (VGA) stage 12. The outputs 14, 16 of the variable gain amplifier stage 20 are connected to a mixer stage (not shown) and also to a comparator 18.

The output of the comparator 18 is connected to a current sink 20 included in a charge pump, the charge pump also including current source 22. The output of the charge pump is connected to one side of a capacitor 24 and also to the input of a scaling buffer 26. The output of the scaling buffer 26 is connected back to the further input 8 of the FGA 6.

The inputs 2, 4 are connected to, and receive signals from, downconversion and processing circuitry (not shown) for downconversion and processing of a radio-frequency DAB signal received at an antenna (also not shown) associated with the DAB receiver chip. The radio-frequency DAB signal in the preferred embodiment is modulated using differential quadrature phase shift keying (DQPSK) in accordance with standard protocols.

In operation the signals at inputs 2, 4 have been downconverted from the carrier frequency, typically of around 200 MHz, to the baseband frequency. The signals at inputs 2, 4 typically have a bandwidth of around 800 KHz.

The signal at input 2 is the positive (p) path and the signal at input 4 is the negative (n) path, of the of the in-phase (I) channel of the downconverted signal. Further circuitry equivalent to that shown in FIG. 1 is also present on the receiver chip and is used to process the p and n paths of the quadrature (Q) channel of the downconverted signal.

In operation the signal on the p path, at input 2, and the signal on the n path, at input 4, are both passed to the FGA 6, each of the signals is amplified and output to a respective output of the FGA.

The FGA is operable to alter the relative d.c. levels of the signal on the p path and the n path in dependence upon the value of the signal applied at further input 8. In the preferred embodiment, the further input 8 is connected to one input of a differential amplifier (not shown) included in the FGA and the input 2 is connected to another input of the differential amplifier. The d.c. level of the signal on the p path at the output of the FGA is then dependent upon the relative values of the signal at the input 2 and the signal at the further input 8.

The outputs of the FGA 6 are connected to low pass filter 10, which has a bandwidth of around 80 KHz and which filters the signals on the p and n paths to remove any unwanted signals outside the desired bandwidth.

The filtered signals on the n and p paths are then passed to the VGA 12 which operates to ensure that the signals on the n and p paths have a desired amplitude. The signals on the n and p paths then pass to a mixer (not shown) where they are upconverted to an intermediate frequency, around 2 MHz in this case.

The upconversion of the signals on the n and p paths ensures that they are compatible with downstream circuitry which is designed to operate at the intermediate frequency.

In variants of the preferred embodiment the signals are passed to downstream circuitry which is designed to operate at baseband frequency, and there is no need for upconversion to an intermediate frequency and the mixer stage is omitted.

Returning to consideration of FIG. 1, the outputs of the VGA 20 are also passed to comparator 18 which compares the signal on the n path with the signal on the p path.

The comparison of the signal on the n path and the signal on the p path by the comparator 18 is a comparison of the magnitude of the instantaneous voltage on the n path with the magnitude of the instantaneous voltage on the p path.

At each instant, the comparator 18 outputs a high signal if the signal on the p path is greater than the signal on the n path by more than a pre-determined amount and a low signal if the signal on the p path is lower than the signal on the n path by more than a pre-determined amount.

If the signal on the p path is greater than the signal on the n path but only by less than the pre-determined amount, or if the signal on the p path is less than the signal on the n path, but only by less than the predetermined amount, then the output of the comparator does not change (so if it was high it would remain high, and if it was low it would remain low). Thus it can be understood that there is some hysterisis at the comparator.

The output of the comparator controls the current sink 20 of the charge pump. The current sink 20 switches on when it receives a high signal from the comparator 18 and switches off when it receives a low signal from the comparator.

The output of the charge pump is connected to capacitor 24, and it can be seen that the potential difference across the capacitor will vary in response to the current sink being switched on or off.

The current output by the current sink 20 when switched on is twice that of the current source 22 of the charge pump. Therefore it can be seen that a 50% duty cycle on the current sink control signal will lead to the potential difference across the capacitor being maintained at a constant level on average. If the comparator outputs a high signal 50% of the time and outputs a low signal 50% of the time, the potential difference across the capacitor will have a long term average which is constant over time.

In general there will be short term fluctuations in the potential difference across the capacitor, due to the switching on and turning off of the current sink 20, even if the long term average of the potential difference is constant. The size of those short term fluctuations is dependent on the time constant of the capacitor 24.

The capacitor 24 is connected to a scaling buffer 26 which outputs a signal which is proportional to the potential difference across the capacitor 24 and passes it back to the further input 8 of the FGA 6. The scaling buffer scales its output signal to be within a suitable range of values for input to the FGA 6. In the preferred embodiment, the potential difference across the capacitor 24 can vary within a range from 0V to +3V and that corresponds to a range of outputs from the scaling buffer from −300 mv to +300 mV.

It can be understood from the above description, that the relative d.c. level of the signal on the n path and the signal on the p path at the output of the FGA will be dependent on the potential difference across the capacitor 24, as the signal at the further input 8 of the FGA is dependent on that potential difference, and the level of the signal at that further input 8 determines the relative levels of the signal on the n path and the signal on the p path at the output of the FGA.

As the relative level of the signal on the n path and the signal on the p path at the output of the FGA 6 feeds forward to determine the output signal of the comparator 18, which in turn determines the potential difference across the capacitor 24, it can be understood that the circuitry of FIG. 1 operates as a negative feedback loop operable to reduce any difference between the d.c. level of the signal on the n channel and the d.c. level of the signal on the p channel.

It will be understood that each of the stages in the apparatus of FIG. 1 can be put into effect in a number of different ways. So, for instance, the scaling buffer stage in the preferred embodiment comprises a transimpedance circuit connected to a voltage divider, but many other ways of putting into effect a scaling buffer stage are of course possible. Similarly the FGA stage in the preferred embodiment comprises a pair of differential amplifiers each provided with a bypass resistor, but many other ways of putting into effect an FGA stage can be envisaged.

It will be understood that the invention has been described above purely by way of example, and modifications of detail can be made within the scope of the invention.

Each feature disclosed in the description and (where appropriate) the claims and drawings may be provided independently or in any appropriate combination.

The invention claimed is:

1. A method of reducing d.c. offset, the method comprising: comparing a variable first signal with a variable second signal; producing a control signal dependent upon the comparison; providing the control signal to a charge pump for generation of a feedback signal; producing the feedback signal in dependence upon at least one earlier value of the feedback signal as well as in dependence upon the comparison; and varying the first signal and/or the second signal in dependence upon the feedback signal thereby to reduce any difference between the d.c. level of the first signal and the d.c. level of the second signal.

2. A method according to claim 1 and comprising the further step of providing the control signal to a current sink of the charge pump.

3. A method according to claim 1 and comprising the further step of providing an output of the charge pump to a capacitor for generation of the feedback signal.

4. A method according to claim 3 wherein the feedback signal is proportional to the potential difference across the capacitor.

5. A method according to claim 1, wherein the first signal and the second signal are each obtained from the same input signal.

6. A method according to claim 5, wherein the first signal is the result of applying a first filter to the input signal and the second signal is the result of applying a second filter to the input signal, and wherein the first filter is around 180° out of phase with the second filter.

7. A method according to claim 1, wherein the first signal and the second signal are each obtained by downconversion of a received radio-frequency signal.

8. A method according to claim 7, wherein the first signal and the second signal input signal are each obtained from the in-phase component or the quadrature component of the radio-frequency signal.

9. A method according to claim 1, wherein the first signal is out of phase with the second signal, and wherein the first signal is around 180° out of phase with the second signal.

10. A method according to claim 1, wherein the first signal comprises the signal on the positive path of an in-phase or quadrature channel of a DAB receiver and the second signal comprises the signal on the negative path of the channel.

11. A method according to claim 1, further comprising increasing the feedback signal if the first signal is higher than the second signal, and decreasing the feedback signal if the second signal is higher than the first signal.

12. A method according to claim 11, further comprising increasing the feedback signal only if the first signal is higher than the second signal by more than a pre-determined amount, and decreasing the feedback signal only if the second signal is higher than the first signal by more than a pre-determined amount.

13. Apparatus for reducing d.c. offset, comprising: amplification means adapted to vary a variable first signal and/or a variable second signal; means adapted to compare the first signal and the second signal and to produce a control signal in dependence upon the comparison; and means for producing a feedback signal and for passing the feedback signal back to the amplification means, wherein the means for producing a feedback signal is adapted to producing the feedback signal in dependence upon at least one earlier value of the feedback signal as well as in dependence upon the comparison, the means for producing the feedback signal being further adapted to receive the control signal and including a charge pump; the amplification means being further adapted to receive the feedback signal and to vary the first signal and/or the second signal in dependence on the feedback signal so as to reduce any difference between the d.c. level of the first signal and the d.c. level of the second signal.

14. Apparatus according to claim 13, wherein the means for producing a feedback signal is further adapted to increase the feedback signal if the first signal is higher than the second signal, and to decrease the feedback signal if the second signal is higher than the first signal.

15. Apparatus according to claim 14, wherein the means for producing a feedback signal is further adapted to increase the feedback signal only if the first signal is higher than the second signal by more than a pre-determined amount, and decreasing the feedback signal only if the second signal is higher than the first signal by more than a pre-determined amount.

16. Apparatus according to claim 13, wherein the charge pump comprises a current sink, the current sink having an input for receiving the control signal.

17. Apparatus according to claim 13, wherein the means for producing a feedback signal comprises a capacitor, the capacitor being adapted to receive an output from the charge pump.

18. Apparatus according to claim 17, wherein the means for producing the feedback signal is adapted to vary the feedback signal in dependence upon the potential difference across the capacitor.

19. Apparatus according to claim 17, wherein the means for producing a feedback signal comprises means for varying the potential difference across the capacitor, the means for varying the potential difference across the capacitor being adapted to increase the potential difference across the capacitor if the first signal is higher than the second signal and to reduce the potential difference across the capacitor if the second signal is higher than the first signal.

20. Apparatus according to claim 19, wherein the charge pump comprises a current source connected to the capacitor and the current source is adapted to output a first current if the first signal is higher than the second signal, and to output a second current if the second signal is higher than the first signal.

21. Apparatus according to claim 13, wherein the first signal and the second signal are each obtained from the same input signal.

22. Apparatus according to claim 13, wherein the first signal and the second signal are each obtained by downconversion of a received radio-frequency signal.

* * * * *